(12) United States Patent
Bearinger et al.

(10) Patent No.: US 7,818,939 B2
(45) Date of Patent: Oct. 26, 2010

(54) SNAP LOCK JOINT

(76) Inventors: Irvin Bearinger, 6439 Peel Road 6, Wallenstein, Ontario (CA) N0B 2S0; Joshua Brubacher, 341 Hill Street, West Montrose, ON (CA) N0B 2V0

( * ) Notice: Subject to any disclaimer, the term of this patent is extended or adjusted under 35 U.S.C. 154(b) by 424 days.

(21) Appl. No.: 11/810,041

(22) Filed: Jun. 5, 2007

(65) Prior Publication Data

US 2008/0302051 A1 Dec. 11, 2008

(51) Int. Cl.
*E04B 1/38* (2006.01)
(52) U.S. Cl. ............... 52/591.1; 52/590.1; 52/745.2; 144/354; 403/381
(58) Field of Classification Search ............... 52/589.1, 52/590.1, 590.2, 591.1, 591.3, 591.4, 592.1, 52/592.2, 588.1, 745.2; 403/345, 364, 381, 403/DIG. 10, 252, 255, 264, 331; 144/344–347, 144/354
See application file for complete search history.

(56) References Cited

U.S. PATENT DOCUMENTS

| | | | | |
|---|---|---|---|---|
| 671,954 | A * | 4/1901 | Eaton | 403/381 |
| 753,791 | A * | 3/1904 | Fulghum | 144/354 |
| 792,979 | A * | 6/1905 | Fulghum | 403/331 |
| 1,032,674 | A * | 7/1912 | Holland | 403/381 |
| 2,144,831 | A * | 1/1939 | Burns | 192/107 R |
| 2,388,297 | A * | 11/1945 | Slaughter | 428/53 |
| 3,731,445 | A * | 5/1973 | Hoffmann et al. | 52/391 |
| 4,099,887 | A * | 7/1978 | Mackenroth | 403/4 |
| 4,640,437 | A * | 2/1987 | Weingartner | 220/560.12 |
| 5,149,109 | A * | 9/1992 | Jelinek et al. | 277/632 |
| 5,475,960 | A * | 12/1995 | Lindal | 52/478 |
| 5,987,845 | A | 11/1999 | Laronde | 52/592.1 |
| 6,101,778 | A * | 8/2000 | M.ang.rtensson | 52/582.1 |
| 6,421,970 | B1 | 7/2002 | Martensson et al. | 52/282.1 |
| 6,505,452 | B1 * | 1/2003 | Hannig et al. | 52/582.1 |
| 6,606,834 | B2 | 8/2003 | Martensson et al. | 52/578 |
| 6,804,926 | B1 * | 10/2004 | Eisermann | 52/592.1 |
| 7,131,242 | B2 | 11/2006 | Martensson et al. | 52/591.3 |
| 7,654,401 | B2 * | 2/2010 | Obergoenner | 217/65 |
| 2002/0112433 | A1 | 8/2002 | Pervan | 52/592.1 |
| 2002/0139077 | A1 * | 10/2002 | Heckford | 52/589.1 |
| 2003/0029115 | A1 * | 2/2003 | Moriau et al. | 52/592.1 |
| 2003/0029116 | A1 * | 2/2003 | Moriau et al. | 52/592.1 |
| 2003/0154681 | A1 * | 8/2003 | Pletzer et al. | 52/578 |
| 2004/0168392 | A1 * | 9/2004 | Konzelmann et al. | 52/589.1 |
| 2005/0016107 | A1 * | 1/2005 | Rosenthal et al. | 52/578 |
| 2006/0269358 | A1 * | 11/2006 | Obergoenner | 403/381 |
| 2007/0113509 | A1 * | 5/2007 | Zhang | 52/592.1 |
| 2010/0155368 | A1 * | 6/2010 | Obergoenner | 217/76 |
| 2010/0155369 | A1 * | 6/2010 | Obergoenner | 217/76 |
| 2010/0155370 | A1 * | 6/2010 | Obergoenner | 217/96 |

* cited by examiner

*Primary Examiner*—Robert J Canfield
(74) *Attorney, Agent, or Firm*—E. H. Oldham

(57) ABSTRACT

This invention describes a snap-lock interlocking joint which locks a pair of mating construction pieces together by the insertion of a specially shaped tongue into a corresponding groove (having a complimentary shape to the tongue). The invention works well with engineered wood composites such as medium density fiberboard and certain other plastic products, namely free foam cellular plastic. The pieces may be joined together in the complete absence of glue or nails. No clamping is required to provide a strong joint.

2 Claims, 3 Drawing Sheets

SNAP LOCK JOINT

BACKGROUND OF THE INVENTION

This invention deals with a method of manufacturing permanent interlocking joints, where it is desired to snap together at least two construction pieces of a material resembling wood which can quickly be assembled to form a composite assembly. This assembly may or may not be incorporated into another assembly or it may be complete as joined. It is to make such an assembly which snap-locks together in the total absence of glue, or other adhesive material, or nails that this invention is directed.

It has been common practice to nail wooden pieces together to form an assembly. With the advent of the powered nailing devices it has even become less complicated to construct a wooden assembly. If the wooden article is to function as a piece of furniture or some other display device where appearance is of importance, the nail holes must be filled with a suitable substance before a finishing coat of varnish or some other protective coating is applied to the surface of the article.

A much slower but clearly an acceptable method of joining wooden construction pieces together is by using glue or an adhesive substance which is applied to the surfaces of the pieces to be joined. In this instance the mating surfaces which are to be joined are suitably prepared for the application of an adhesive material. After the adhesive has been applied to the mating surfaces it is standard practice to clamp the pieces undergoing the gluing process in a particular configuration. The process may require that the pieces undergoing the gluing operation be held in a suitable "jig" in order to ensure correct alignment of the pieces undergoing joining.

In any event the two surfaces which are to be joined together are either both coated with an adhesive material, or only one surface is coated. The two wooden pieces are then pressed or clamped together at the joining surfaces where the adhesive material has been previously applied until the adhesive material has set or cured. The clamping device may now be removed from the glued assembly. With this method of joining no nail holes are present to be filled before finishing the assembly.

In the woodworking and construction industries, methods of joining wooden or wooden composite members which snap-lock together in the absence of glue or nails have been sought without much success until this time.

SUMMARY OF THE INVENTION

This invention seeks to assemble two pieces of wood (or other suitable material) in a snap lock joint in the complete absence of glue or nails to form a permanent joined assembly. This is accomplished by providing a suitably prepared pair of construction members each having a joining surface which has been machined to a special profile. The profile provided on the members yields what appears to be a "tongue and groove" but it is not such a joint.

One of the members is provided with a "tongue" that is somewhat wedged shaped as it arises from the mitred surface on which it formed. The widest part of the tongue occurs at some distance above the mitred surface.

A mating piece of wood (or other similar material) will be supplied with a specially profiled groove which is the complimentary image of the tongue supplied in the first instance. The wood surrounding the groove must have sufficient elasticity to permit the groove to expand slightly during the insertion process so as to permit the insertion of the tongue into the groove. The groove then snaps shut and grasps the specially shaped tongue to form the completed assembly. The result is a finished assembly which snaps together and once the snapped together, remains together until pried apart.

| PRIOR ART | |
|---|---|
| U.S. Patents | |
| 7,131,242 | Nov. 7, 2006 |
| 6,606,834 | Aug. 19, 2003 |
| 6,421,970 | Jul. 23, 2002 |
| 5,987,845 | Nov. 23, 1999 |

DESCRIPTION OF THE PREFERRED EMBODIMENT

Figure 1:
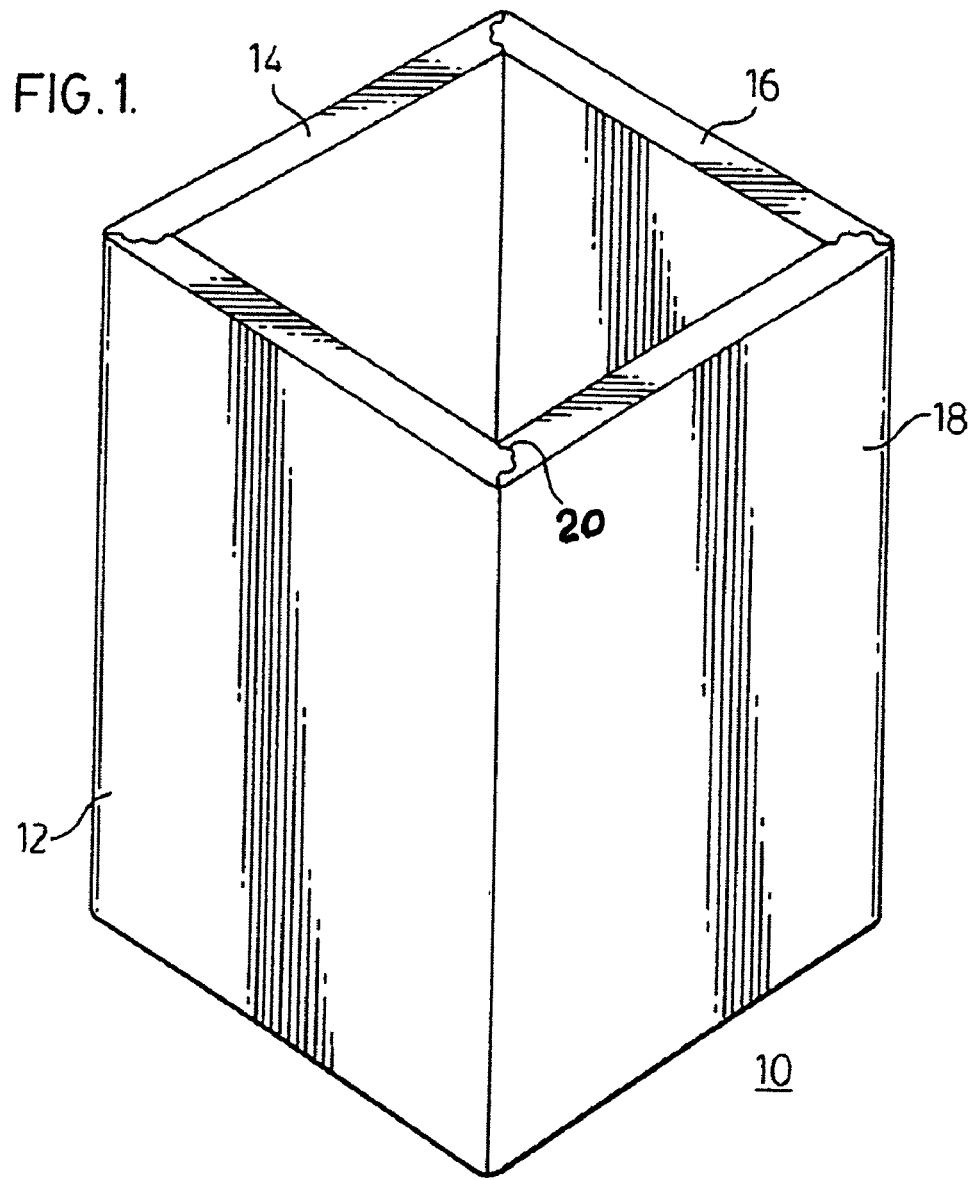
FIG. 1 is a perspective view of the completed assembly.

Referring now to FIG. 1, a finished assembly 10 is shown. This assembly comprises members 12, 14, 16, 18 assembled together by means of a specially shaped joint 20 which holds the entire assembly tight together in a stable manner in the absence of any adhesive. The joint 20 is produced in both components by a milling operation; it is most difficult to produce this profile with a router. For convenience, the shape of the joint described in this disclosure will be referred to as being frusto-cardioid shaped. This joint is produced by several machining operations and produces a stable joint. Other shapes for the interlocking parts of the joints are no doubt possible, however applicants have selected this shape for this application.

Figure 2:
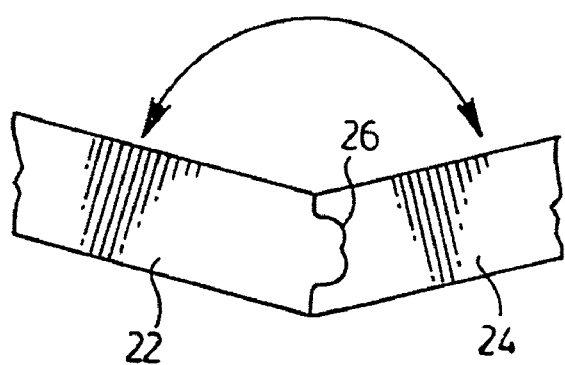
FIG. 2 shows a joint of an assembly where the angles between the members being joined is much greater than 90 degrees.
Figure 3:
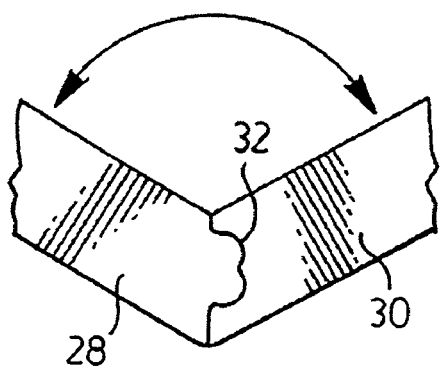
FIG. 3 shows an assembled joint where the members being joined lie at an angle of slightly greater than 90 degrees.

As shown in FIGS. 2 and 3 the frusto-cardioid joint may be effectively used to connect members which are to form an angle greater than 90 degrees; for instance when assembling a polygonal assembly. It will be seen that members 22 and 24 are connected at a joint 26.

Figure 4:
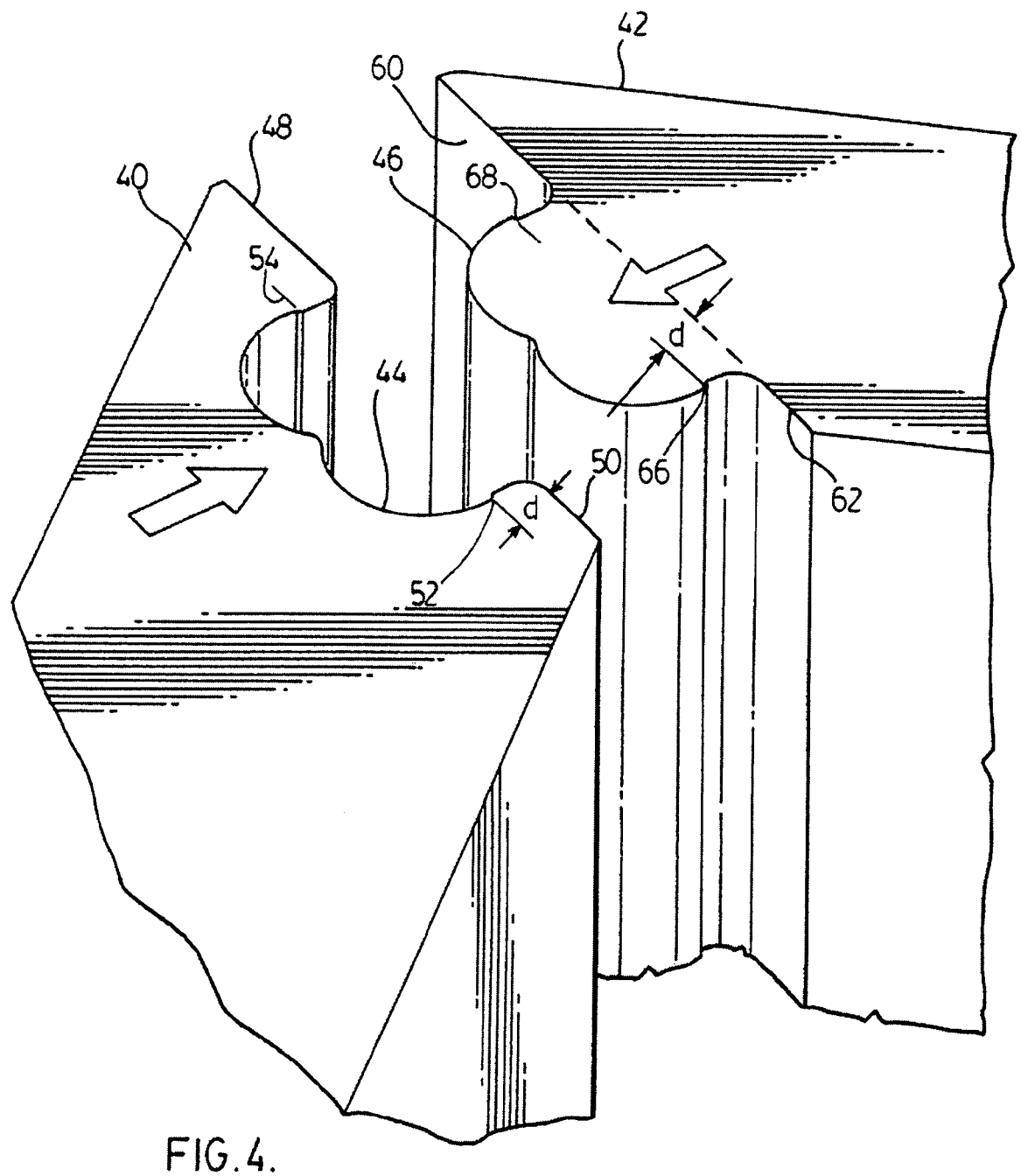
FIG. 4 is a partial sectional perspective of a pair of assembly members about to be coupled.

The frusto-cardioid joint is probably best illustrated at FIG. 4. Here a pair of composite wooden members 40 and 42 are about to be snapped together in a joined relationship. Member 40 is provided with a female receiving groove 44 and member 42 is provided with a complimentary shaped projection 46. The member 40 is provided with a pair of coplanar surfaces 48 and 50 which form the abutments on the base surface for the resulting joint between members 60 and 62.

The groove 44 has a peculiar shape in that the widest dimension of groove 44 occurs at a line joining points 52 and 54 which is located at a distance "d" from the base surface 48-50.

Member 42 is provided with a male projection 46 which has the surface contour to match that of groove 44 of the member 40. Member 42 has two engaging coplanar surfaces 60 and 62 which will abut surfaces 48 and 50 when the joint between members 40-42 has been accomplished.

The widest portion of projection 46 occurs at a line passing through points 66-68 and this point occurs at a distance "d" from the coplanar surfaces 60 and 62 of member 42.

To assemble the joint, the groove 44 of member 40 is mated with the projection 46 of member 42. The projection 46 is forced into groove 44 by any suitable means, usually a mallet. The groove 44 springs open slightly and the projection 46 slides into groove 44 until the base surfaces 48-60 and 50-62 engage each other. At this time the widest part of projection 46 is now located at the widest part of groove 44.

Because of this peculiar shape the curve, which is referred to as a frusto-cardioid, it is most difficult to produce this shape with a router. It is usually produced by at multi spindle machine usually referred to as a moulder.

Figure 5:
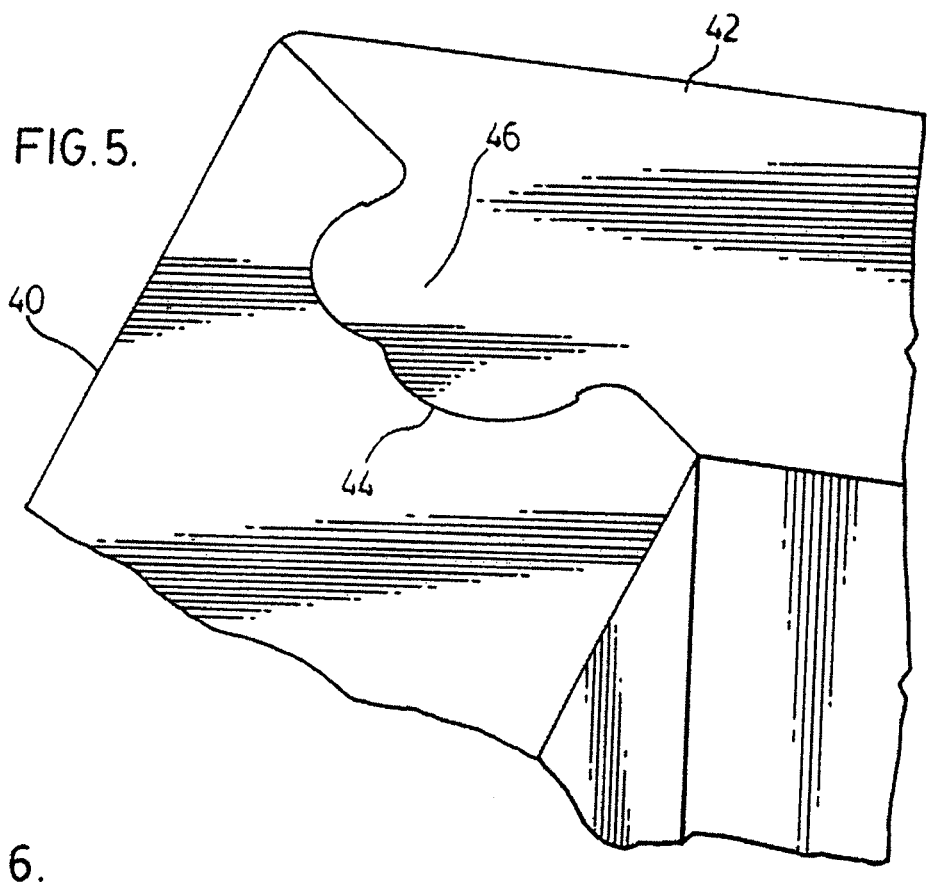
FIG. 5 shows the members shown in FIG. 4 now in an assembled configuration.
Figure 6:
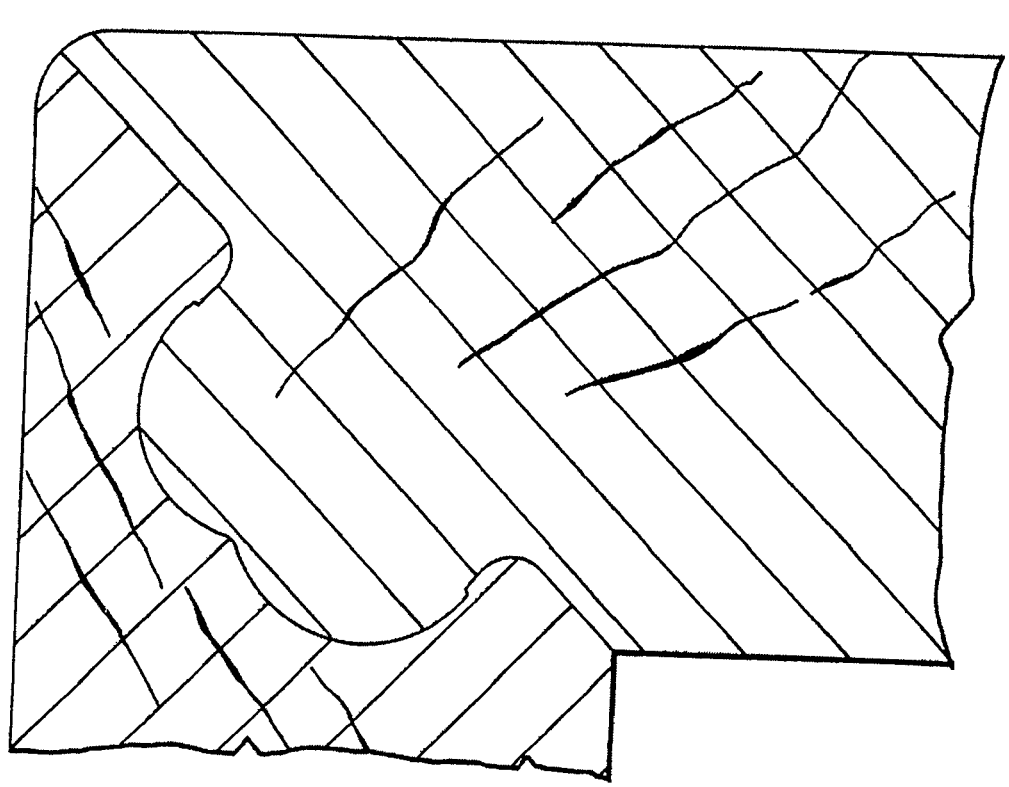
FIG. 6 is a plan view of a pair of wooden members coupled in an assembly.

FIG. 5 shows the joint of FIG. 4 assembled. Here the members 40 and 42 have been snapped together to form a complete interlocking joint.

The opening in female groove 44 of member 40 must be sprung apart slightly to accept projection 46 of member 42. As soon as the projection 46 enters the groove 44, the elasticity of the material forming the groove 44 returns the groove 44 to its original profile and projecting strip 46 is grasped by groove 44.

This joint is intended for materials such as engineered wood products or wood products which by their nature are not extrudable. Other products which may be successfully utilized are: high impact plastic materials such as PVC; cellular PVC and so on. The materials which have yielded the best interlocking joints to date are MDF composite wood products. These materials exhibit no grain preference and have enough elasticity to yield a stable joint when assembled.

Although some metals may be extruded to yield the frusto-cardioid joint, generally the modules of elasticity has been found to be too high to permit the insertion of the projection into the female groove.

In summary, this is truly a "green" invention. No glue or nails are required to make the joint between two mating pieces. If the completed assembly is being used as a temporary assembly, the whole assembly may be recycled at a later date without fear of contamination of the surrounding media with glue residue etc.

To a large extent the success of this invention resides in the elasticity of the material wherein the recess is formed. That is why the engineered composite wood products such as MDF and HDF composites perform so well.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that the modifications and embodiments are intended to be included within the scope of the dependent claims.

What is claimed:

1. A glueless interlocking snap-lock joint for a pair of suitable members which are to be joined at their edge surfaces comprising:
    a female member having a frusto-cardioidally shaped recess being formed in said member at said edge surface, said recess being shaped to increase in width to a maximum at a predetermined depth of said recess, said recess having a curved surface remote from said edge surface;
    a male member to be joined to said female member by the insertion of an frusto-cardioidally shaped projection carried by said male member into said recess, said projection having a shape corresponding to the shape of said recess in said female member;
    said recess having an opening for said recess which may be elastically stretched to accommodate the insertion of said projection and,
    wherein said recess has sufficient elasticity to grasp and captivate said projection once it is completely inserted into said recess to hold said pair of suitable construction members in a predetermined angular relationship.

2. A method of constructing a glueless joint between a pair of suitable construction members comprising:
    selecting one of the members for the provision of machining a recess in a selected surface of said member, said recess having a frusto-cardioidally shape in said member;
    said recess having an opening in said surface, and wherein the width of said recess increases as the recess deepens, said recess having a curved surface remote from said opening;
    selecting another of said members for joining said one member to the other member at the surface thereof;
    machining a frusto-cardioidally projection along an edge surface of said other member, said projection having a predetermined shape and size corresponding to said shape of said recess in said one member,
    pushing said projection into said recess to expand said opening in said one member, and subsequently pushing said other member until said projection is completely inserted inside said frusto-cardioidally shaped recess.

\* \* \* \* \*